United States Patent
Huang et al.

(10) Patent No.: US 11,511,431 B2
(45) Date of Patent: Nov. 29, 2022

(54) METHOD FOR MONITORING BALANCED STATE OF BIPED ROBOT

(71) Applicant: BEIJING INSTITUTE OF TECHNOLOGY, Beijing (CN)

(72) Inventors: Qiang Huang, Beijing (CN); Xuechao Chen, Beijing (CN); Zhangguo Yu, Beijing (CN); Tong Wu, Beijing (CN); Mingyue Qin, Beijing (CN); Qingqing Li, Beijing (CN); Libo Meng, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 267 days.

(21) Appl. No.: 16/914,836

(22) Filed: Jun. 29, 2020

(65) Prior Publication Data
US 2021/0276190 A1   Sep. 9, 2021

(30) Foreign Application Priority Data
Mar. 6, 2020   (CN) .......................... 202010150780.3

(51) Int. Cl.
*B25J 9/16*    (2006.01)
*B25J 13/08*   (2006.01)

(52) U.S. Cl.
CPC ............. *B25J 9/1674* (2013.01); *B25J 9/163* (2013.01); *B25J 9/1605* (2013.01); *B25J 9/1653* (2013.01); *B25J 13/088* (2013.01)

(58) Field of Classification Search
CPC ........ B25J 9/1674; B25J 9/1605; B25J 9/163; B25J 9/1653; B25J 13/088; B62D 57/032; G06K 9/6256; G06K 9/6269
See application file for complete search history.

(56) References Cited

U.S. PATENT DOCUMENTS

| | | | |
|---|---|---|---|
| 2005/0113973 A1* | 5/2005 | Endo ................... | B62D 57/032 700/245 |
| 2014/0288705 A1* | 9/2014 | Yun ..................... | B62D 57/032 700/246 |

(Continued)

OTHER PUBLICATIONS

Jeong-Jung Kim et al., "A Machine Learning Approach to Falling Detection and Avoidance for Biped Robots", 2011, SICE Annual Conference (Year: 2011).*

*Primary Examiner* — Adam R Mott
*Assistant Examiner* — Elizabeth Rose Neleski
(74) *Attorney, Agent, or Firm* — Wenderoth, Lind & Ponack, L.L.P.

(57) ABSTRACT

The present invention provides a method for monitoring a balanced state of a humanoid robot, comprising: acquiring state data of the robot falling in different directions and being stable, forming a support vector machine (SVM) training data set and obtaining, by training, an initial SVM classifier; inputting the state data of the robot to the trained SVM classifier, so that the SVM classifier outputs a classification result; taking statistics on a proportion of cycles judged to have an impending fall in the total number of control cycles within a judgment buffer time after the SVM classifier outputs the classification result, and finally determining a monitoring result of the balanced state of the robot according to the proportion and finally extracting state data of misjudged cycles within the buffer time, adding the state data to the current training data set and updating the SVM classifier, eventually enabling the classifier to achieve the effects of matching motion capabilities of the robot and monitoring the balanced state.

16 Claims, 5 Drawing Sheets

(56) References Cited

U.S. PATENT DOCUMENTS

2020/0369333 A1\* 11/2020 Lavalley ............... B25J 11/0005
2021/0081724 A1\* 3/2021 Ma ....................... G06K 9/6263

\* cited by examiner

"Impending Fall" or "No Fall" determined within judgment buffer time (0.2s) after fall judgment by classifier

METHOD FOR MONITORING BALANCED STATE OF BIPED ROBOT

TECHNICAL FIELD

The present invention relates to the field of humanoid robot technologies, and in particular, to a method for monitoring a balanced state of a humanoid robot.

BACKGROUND

Nowadays, although a humanoid robot can walk stably on flat ground in an undistributed environment, the robot often falls due to instability under large disturbance. The robot needs to have a detection mechanism for disturbance. That is, the humanoid robot needs to detect in time whether a fall will occur, so as to prevent the occurrence of a fall or take protective actions to reduce damage to the robot.

Related methods for monitoring a balanced state of a humanoid robot exist in the prior art. For example, the paper "Zero Step Capturability for Legged Robots in Multicontact" has described a method for monitoring a balanced state using a friction cone constraint, which can perform fall prediction during stable standing. Further, the paper "Learning to Predict Humanoid Fall" has described a method for predicting a fall of a humanoid robot using a machine learning method. The method performs prediction using a decision tree prediction model, and can predict a fall when the robot is in motion.

Currently, the method for monitoring a balanced state based on a physical model has the problem that desirable effects can be achieved only when a robot stands stably, and prediction cannot be performed accurately if a contact point slides. The method based on machine learning needs to use motion data including center of mass (COM) displacement, angular momentum, and so on, which is difficult to obtain. Moreover, the method needs to train 16 classifiers according to different states of contact between feet and the ground. On one hand, a large amount of data during falls needs to be obtained to serve as a training data set, and on the other hand, the robot is easily damaged during data collection.

SUMMARY

In view of the deficiencies in the prior art, the present invention provides a method for monitoring a balanced state of a humanoid robot. The present invention obtains a training data set through a simple method, and meanwhile can effectively monitor a balanced state of the robot in motion.

The present invention achieves the aforementioned technical purpose by the following technical means.

A method for monitoring a balanced state of a humanoid robot comprises: acquiring state data of the robot falling in different directions and being stable, forming a support vector machine (SVM) training data set and obtaining, by training, an initial SVM classifier; inputting the state data of the robot to the trained SVM classifier, so that the SVM classifier outputs a classification result; taking statistics on a proportion of cycles judged to have an impending fall in the total number of control cycles within a judgment buffer time after the SVM classifier outputs the classification result, and finally determining a monitoring result of the balanced state of the robot according to the proportion and finally extracting state data of misjudged cycles within the buffer time, adding the state data to the current training data set and updating the SVM classifier, eventually enabling the classifier to achieve the effects of matching motion capabilities of the robot and monitoring the balanced state.

Further, a method for obtaining the state data is: when the robot stands stably and is free of motion control, pushing the robot by a force in a certain direction to make it fall, capturing all state data from starting pushing to the robot falling completely to a ground to serve as a fall data set and placing a fall label; selecting a proper pushing force so that the robot gets as close to instability as possible but does not fall, also obtaining state data to serve as a stable data set and placing a stable label, and using the labelled fall data set and stable data set as the training data set of the initial SVM classifier.

Further, the state data comprises an angular velocity and an accelerated linear velocity of an x axis, a y axis, and a z axis of a robot body and a distance between a projection point of a center of mass of the body on the ground and a boundary of a current support surface, and forms a seven-dimensional feature vector.

Further, the angular velocity and the accelerated linear velocity of the x axis, the y axis, and the z axis of the robot body are obtained by estimating a motion state of the robot body using extended Kalman filtering; a current state is predicted using a system equation according to an assumption that a linear velocity and an angular velocity of a foot in contact with the ground are zero and a triaxial angular velocity and a triaxial acceleration output by an inertial measurement unit (IMU); and a prior state is updated according to a position and an attitude of the contact foot in combination with joint angle measurement and forward kinematics analysis, and angular velocity and acceleration data of the x axis, the y axis, and the z axis of the robot is finally obtained.

Further, a calculation method for the distance between the projection point of the center of mass of the body on the ground and the boundary of the current support surface is: calculating a position of a projection of the center of mass of the robot body on the ground according to an attitude angle of the robot, and meanwhile calculating the distance between the projection point of the center of mass of the body on the ground and the boundary of the current support surface according to a velocity direction of the robot and joint angles of a leg.

Further, 0.2 s after each fall judgment made by the classifier is the judgment buffer time.

Further, when the proportion of the cycles judged by the SVM classifier to have a fall is greater than a set threshold, it is eventually judged that a fall is about to occur; otherwise, it is still judged that stability exists.

Further, each time a buffer time entry condition is reached and a fall judgment condition is not reached and it is eventually judged that the robot is stable, state data in misjudged cycles within the buffer time is extracted and added to the training data set, and retraining is performed to update the SVM classifier.

Beneficial Effects 1. the present invention mainly solves the technical problem of monitoring a balanced state of a humanoid robot under external disturbance, namely, giving a fall waning within a period of time before the robot falls to the ground, and prompting the robot to change the motion state or perform protective actions to protect key parts from damage.

2. The existing detection methods can only perform monitoring in a standing state. Such methods have limited application scenarios. Moreover, it is very difficult to obtain fall data in real robots in methods requiring a large amount of training data.

3. The prediction method in the present invention can perform monitoring during motion of a robot and is more practical. Meanwhile, the manner of obtaining training data causes less damage to the physical robot and can be better applied to physical humanoid robots.

4. In the present invention, a judgment buffer time is set after the classifier outputs a judgment result, a monitoring result of a balanced state of the robot is finally determined according to a proportion of cycles having an impending fall in the total number of control cycles within the judgment buffer time, and training data is updated for misjudgments, thereby achieving the effect of matching motion capabilities of the robot so as to improve the accuracy of prediction and reduce misjudgments.

DETAILED DESCRIPTION OF THE EMBODIMENTS

The present invention is further illustrated below with reference to the accompanying drawings and specific embodiments, but the protection scope of the present invention is not limited thereto.

Since a humanoid robot has a complex structure and is easily damaged during a fall, it is difficult to obtain fall data required for training. Moreover, an SVM can also obtain desirable classification effects on a small sample training set; this feature is suitable for application in monitoring of a balanced state of a humanoid robot. Such a machine learning algorithm is similar to a human learning process in that an approximation model for the robot fall problem is obtained according to known features, and state prediction is performed according to the learned model without the need to use kinetic parameters of the robot.

Figure 4:
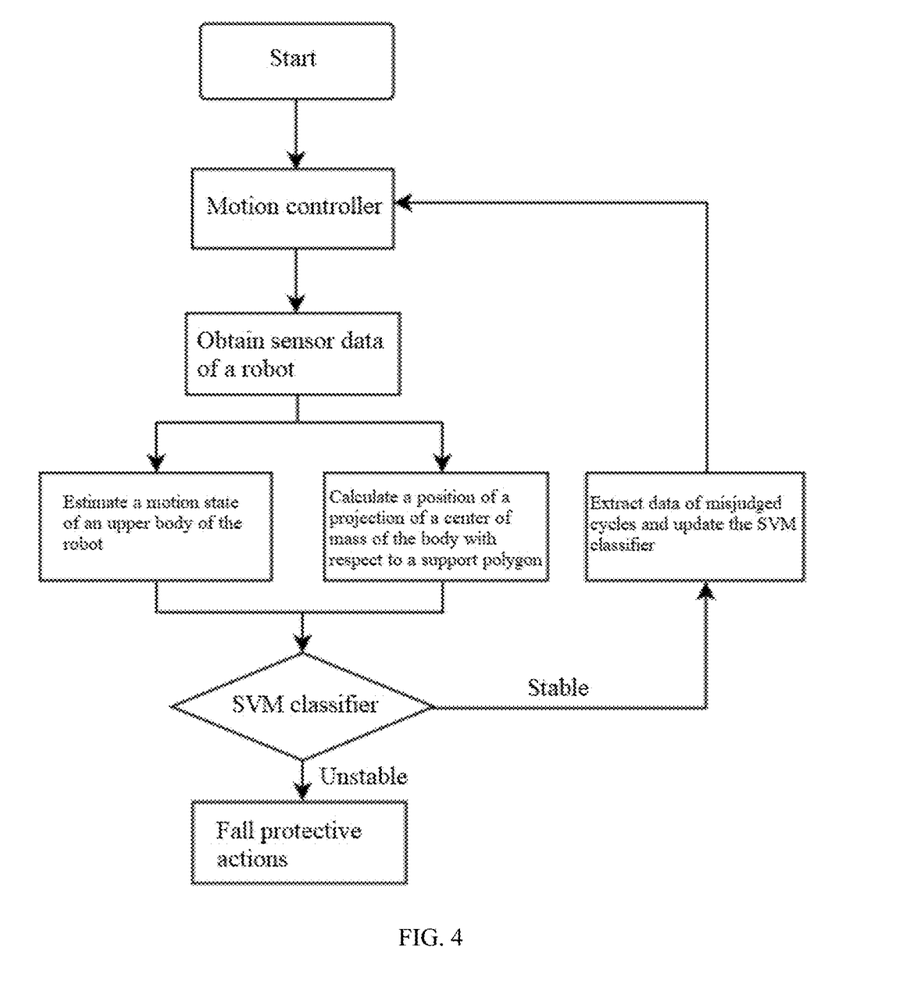
FIG. 4 is a flowchart illustrating monitoring of a balanced state.
Figure 5:
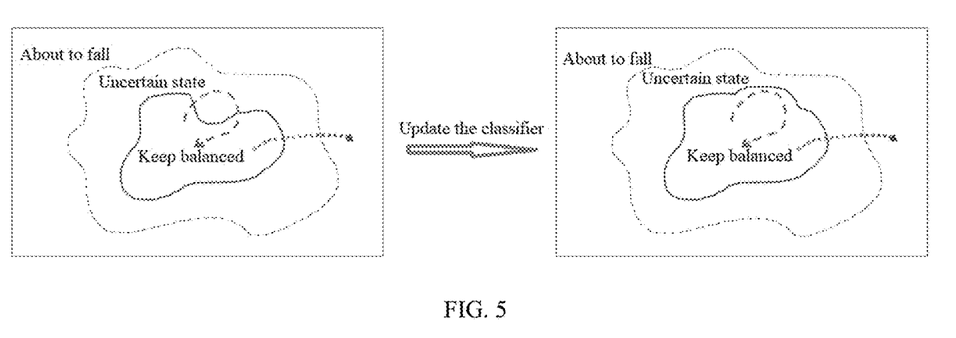
FIG. 5 is a schematic view of the update effect of a classifier.

A flowchart of fall detection in a method for monitoring a balanced state of a humanoid robot designed in the present invention is shown in FIG. 4.

First, state data of the robot is obtained in each control cycle where a controller of the robot functions normally. The state data of the robot includes two parts: one part is triaxial (x-axis, y-axis, and z-axis) angular velocity and acceleration data of the robot, and the other part is a distance between a projection of a center of mass of a body on the ground and a boundary of a current support surface. In this embodiment, a method for obtaining the triaxial (x-axis, y-axis, and z-axis) angular velocity and acceleration data of the robot is: obtaining, by a sensor, a triaxial angular velocity and a triaxial acceleration output by an IMU of the humanoid robot, and then predicting a current state using extended Kalman filtering (Extended Kalman filter) according to an assumption that a linear velocity and an angular velocity of a foot in contact with the ground are zero; updating a prior state (current state) according to a position and an attitude of the contact foot in combination with joint angle measurement and forward kinematics analysis, finally obtaining an estimated value of a motion state of the robot body, and extracting triaxial (x-axis, y-axis, and z-axis) angular velocity and acceleration data of the robot from the estimated value of the motion state of the robot body.

Figure 1:
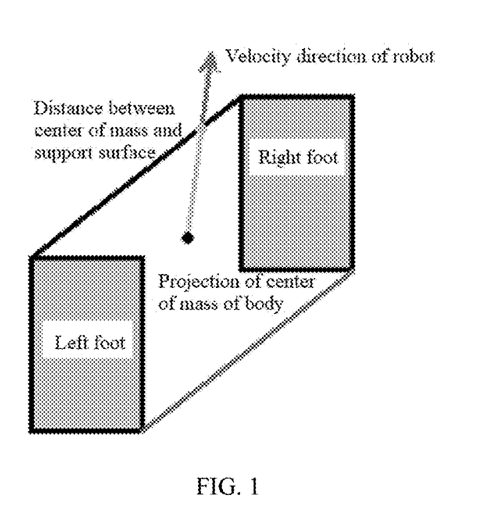
FIG. 1 is a schematic view of a distance between a projection point of a center of mass of a body on a ground and a boundary of a current support surface.

In this embodiment, a method for obtaining the distance between the projection of the center of mass of the body on the ground and the boundary of the current support surface is: calculating a position of a projection of the center of mass of the robot body on the ground according to an attitude angle of the robot, and meanwhile calculating the distance between the projection point of the center of mass of the body on the ground and the boundary of the current support surface according to a velocity direction of the robot and joint angles of a leg, as shown in FIG. 1.

Finally, the aforementioned state data of the robot, namely, the triaxial (x-axis, y-axis, and z-axis) angular velocity and acceleration of the robot and the distance between the projection point of the center of mass of the body on the ground and the boundary of the current support surface, forms a seven-dimensional feature vector.

Before detection, it is needed to obtain a fall data set of the robot and train an initial SVM classifier. To avoid damage to the robot, the number of times of pushing the robot must be reduced as much as possible and buffer measures must be taken. When the robot stands stably and is free of control, the robot is pushed forward by a force to fall, all feature vector groups from starting pushing to the robot falling completely to the ground are captured to serve as a fall data set and a fall label is placed; the same method is used to select a proper pushing force, so that the robot gets as close to instability as possible but does not fall, feature vector groups are also obtained to serve as a stable data set and a stable label is placed. Finally, the labelled stable data set and fall data set are used as an SVM training data set, and the SVM training data set is input to the SVM to obtain, by training, the initial classifier for the forward falling state of the robot. The same steps are repeated to obtain, backward, leftward, and rightward, classifiers corresponding to data training, so that a falling direction of the robot can be judged during detection.

A method for training an SVM classifier is:
A process of calculating an optimal hyperplane of a linearly separable mode of a support vector machine (SVM) is as follows:

A training sample is $\{x_i, y_i\}_{i=1}^N$, where $x_i$ is an ith input feature vector, and $y_i \in \{-1, 1\}$ is a category label. Assume that a hyperplane equation for separation is:

$$\omega^T x + b = 0$$

where $\omega$ is a parameter vector, x is a dimension vector, and b is a constant term of a hyperplane function, and assume that optimal $\omega$ and b are respectively $\omega_0$ and $b_0$, then the optimal classification hyperplane is:

$$\omega_0 x + b_0 = 0$$

Figure 2:
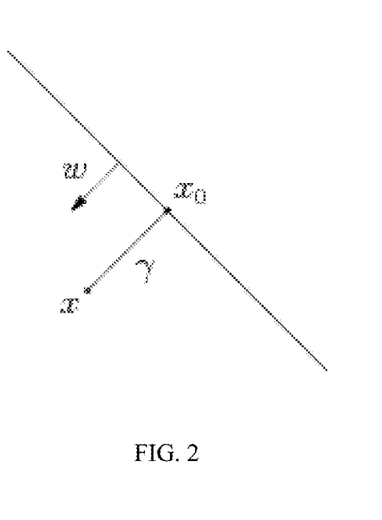
FIG. 2 is a schematic view of a support vector.

Suppose for a point x, y is a category label of the point. A corresponding point obtained by vertically projecting the point x onto the hyperplane is $x_0$, $\omega$ is a vector perpendicular to the hyperplane, and $\gamma$ is a distance from the sample x to a classification margin, as shown in FIG. 2.

It can be calculated that:

$$\gamma = y \cdot \frac{\omega^T x + b}{\|\omega\|} = \frac{y f(x)}{\|\omega\|}$$

where y is a category label; $f(x)$ represents the hyperplane, that is, $f(x)=\omega^T x+b$; then an optimization objective is:

$$\max \frac{yf(x)}{\|\omega\|}$$
$$\text{s.t.} \quad \frac{y_i f(x_i)}{\|\omega\|} \geq \frac{yf(x)}{\|\omega\|} \quad i=1\cdots n$$

Let a function margin if $yf(x)=1$; then an objective function may be converted into:

$$\max \frac{\|\omega\|}{2}$$
$$\text{s.t.} \quad y_i \cdot (\omega^T x+b) \geq 1 \quad i=1\cdots n$$

Finally, a method of Lagrange multipliers is used to solve this optimization problem so as to obtain an optimal hyperplane. Data can be classified according to the optimal hyperplane.

State data of the robot to be classified is input to the trained SVM classifier, and a classification result is output through the SVM classifier.

Figure 3:
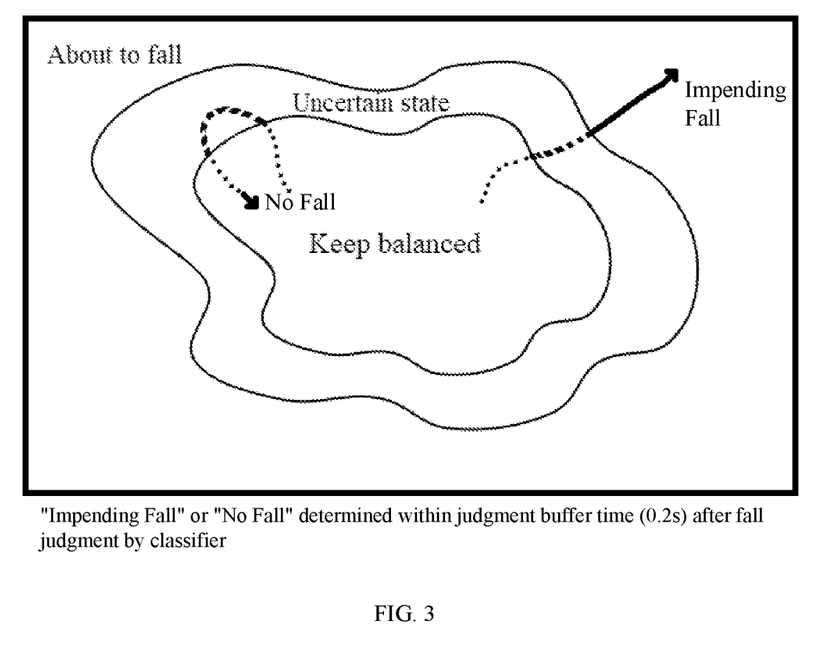
FIG. 3 is a schematic view of a judgment buffer time.

Since the fall of the robot is not an instantaneous state, a judgment buffer time is set, as shown in FIG. 3. That is, statistics are taken on a proportion of cycles judged to have an impending fall in the total number of control cycles within a time of 0.2 s after each fall judgment made by the classifier. When the proportion of the cycles judged to have a fall is greater than a set threshold, it is eventually judged that a fall is about to occur; otherwise, it is still judged that stability exists. Each time a buffer time entry condition is reached and a fall judgment condition is not reached and it is eventually judged that the robot is stable, state data in misjudged cycles within the buffer time is extracted and added to the training data set, and retraining is performed to update the SVM classifier. Training data is updated according to misjudgments, so that the effect of matching motion capabilities of the robot can be achieved, and the accuracy of prediction can be desirably improved to reduce misjudgments.

The described embodiment is a preferred embodiment of the present invention, but the present invention is not limited to the aforementioned embodiment. Any obvious improvements, substitutions or modifications that can be made by those skilled in the art without departing from the essential content of the present invention all fall within the protection scope of the present invention.

What is claimed is:

1. A method for monitoring a balanced state of a humanoid robot, comprising:
    acquiring state data of the robot falling in different directions and being stable;
    forming a support vector machine (SVM) training data set and obtaining, by training, an initial SVM classifier;
    inputting the state data of the robot to the initial SVM classifier, so that the SVM classifier outputs a classification result;
    taking statistics on a proportion of cycles judged to have an impending fall in the total number of control cycles within a judgment buffer time after the SVM classifier outputs the classification result;
    determining a monitoring result of the balanced state of the robot according to the proportion and extracting state data of misjudged cycles within the judgment buffer time;
    adding the state data of misjudged cycles to the current training data set and updating the SVM classifier; and
    eventually enabling the classifier to match motion capabilities of the robot and realize monitoring of the balanced state of the humanoid robot,
    wherein the method for acquiring state data comprises: when the robot stands stably and is free of motion control, pushing the robot by a force in a certain direction to make it fall, capturing all state data from starting pushing to the robot falling completely to a ground to serve as a fall data set and placing a fall label; selecting a proper pushing force so that the robot gets as close to instability as possible but does not fall, also obtaining state data to serve as a stable data set and placing a stable label, and using the labelled fall data set and stable data set as the training data set of the initial SVM classifier.

2. The method for monitoring a balanced state of a humanoid robot according to claim 1, wherein the state data comprises an angular velocity and an accelerated linear velocity of an x axis, a y axis, and a z axis of a robot body and a distance between a projection point of a center of mass of the body on the ground and a boundary of a current support surface, and forms a seven-dimensional feature vector.

3. The method for monitoring a balanced state of a humanoid robot according to claim 2, wherein the angular velocity and the accelerated linear velocity of the x axis, the y axis, and the z axis of the robot body are obtained by estimating a motion state of the robot body using extended Kalman filtering; a current state is predicted using a system equation according to an assumption that a linear velocity and an angular velocity of a foot in contact with the ground are zero and a triaxial angular velocity and a triaxial acceleration output by an inertial measurement unit (IMU); and a prior state is updated according to a position and an attitude of the contact foot in combination with joint angle measurement and forward kinematics analysis, and angular velocity and acceleration data of the x axis, the y axis, and the z axis of the robot is finally obtained.

4. The method for monitoring a balanced state of a humanoid robot according to claim 2, wherein a calculation method for the distance between the projection point of the center of mass of the body on the ground and the boundary of the current support surface is: calculating a position of a projection of the center of mass of the robot body on the ground according to an attitude angle of the robot, and meanwhile calculating the distance between the projection point of the center of mass of the body on the ground and the boundary of the current support surface according to a velocity direction of the robot and joint angles of a leg.

5. The method for monitoring a balanced state of a humanoid robot according to claim 1, wherein 0.2 s after each fall judgment made by the classifier is the judgment buffer time.

6. The method for monitoring a balanced state of a humanoid robot according to claim 5, wherein when the proportion of the cycles judged by the SVM classifier to have a fall is greater than a set threshold, it is eventually judged that a fall is about to occur; otherwise, it is still judged that stability exists.

7. The method for monitoring a balanced state of a humanoid robot according to claim 5, wherein each time a judgment buffer time entry condition is reached and a fall judgment condition is not reached and it is eventually judged that the robot is stable, state data in misjudged cycles within the judgment buffer time is extracted and added to the training data set, and retraining is performed to update the SVM classifier.

8. The method for monitoring a balanced state of a humanoid robot according to claim 2 wherein 0.2 s after each fall judgment made by the classifier is the judgment buffer time.

9. The method for monitoring a balanced state of a humanoid robot according to claim 8, wherein when the proportion of the cycles judged by the SVM classifier to have a fall is greater than a set threshold, it is eventually judged that a fall is about to occur; otherwise, it is still judged that stability exists.

10. The method for monitoring a balanced state of a humanoid robot according to claim 8, wherein each time a judgment buffer time entry condition is reached and a fall judgment condition is not reached and it is eventually judged that the robot is stable, state data in misjudged cycles within the judgment buffer time is extracted and added to the training data set, and retraining is performed to update the SVM classifier.

11. The method for monitoring a balanced state of a humanoid robot according to claim 3, wherein 0.2 s after each fall judgment made by the classifier is the judgment buffer time.

12. The method for monitoring a balanced state of a humanoid robot according to claim 11, wherein when the proportion of the cycles judged by the SVM classifier to have a fall is greater than a set threshold, it is eventually judged that a fall is about to occur; otherwise, it is still judged that stability exists.

13. The method for monitoring a balanced state of a humanoid robot according to claim 11, wherein each time a judgment buffer time entry condition is reached and a fall judgment condition is not reached and it is eventually judged that the robot is stable, state data in misjudged cycles within the judgment buffer time is extracted and added to the training data set, and retraining is performed to update the SVM classifier.

14. The method for monitoring a balanced state of a humanoid robot according to claim 4, wherein 0.2 s after each fall judgment made by the classifier is the judgment buffer time.

15. The method for monitoring a balanced state of a humanoid robot according to claim 14, wherein when the proportion of the cycles judged by the SVM classifier to have a fall is greater than a set threshold, it is eventually judged that a fall is about to occur; otherwise, it is still judged that stability exists.

16. The method for monitoring a balanced state of a humanoid robot according to claim 14, wherein each time a judgment buffer time entry condition is reached and a fall judgment condition is not reached and it is eventually judged that the robot is stable, state data in misjudged cycles within the judgment buffer time is extracted and added to the training data set, and retraining is performed to update the SVM classifier.

* * * * *